July 18, 1939.  R. E. SMITH  2,166,270
SPLIT DRIVE DUAL CONTROL
Filed Sept. 24, 1937  3 Sheets-Sheet 2
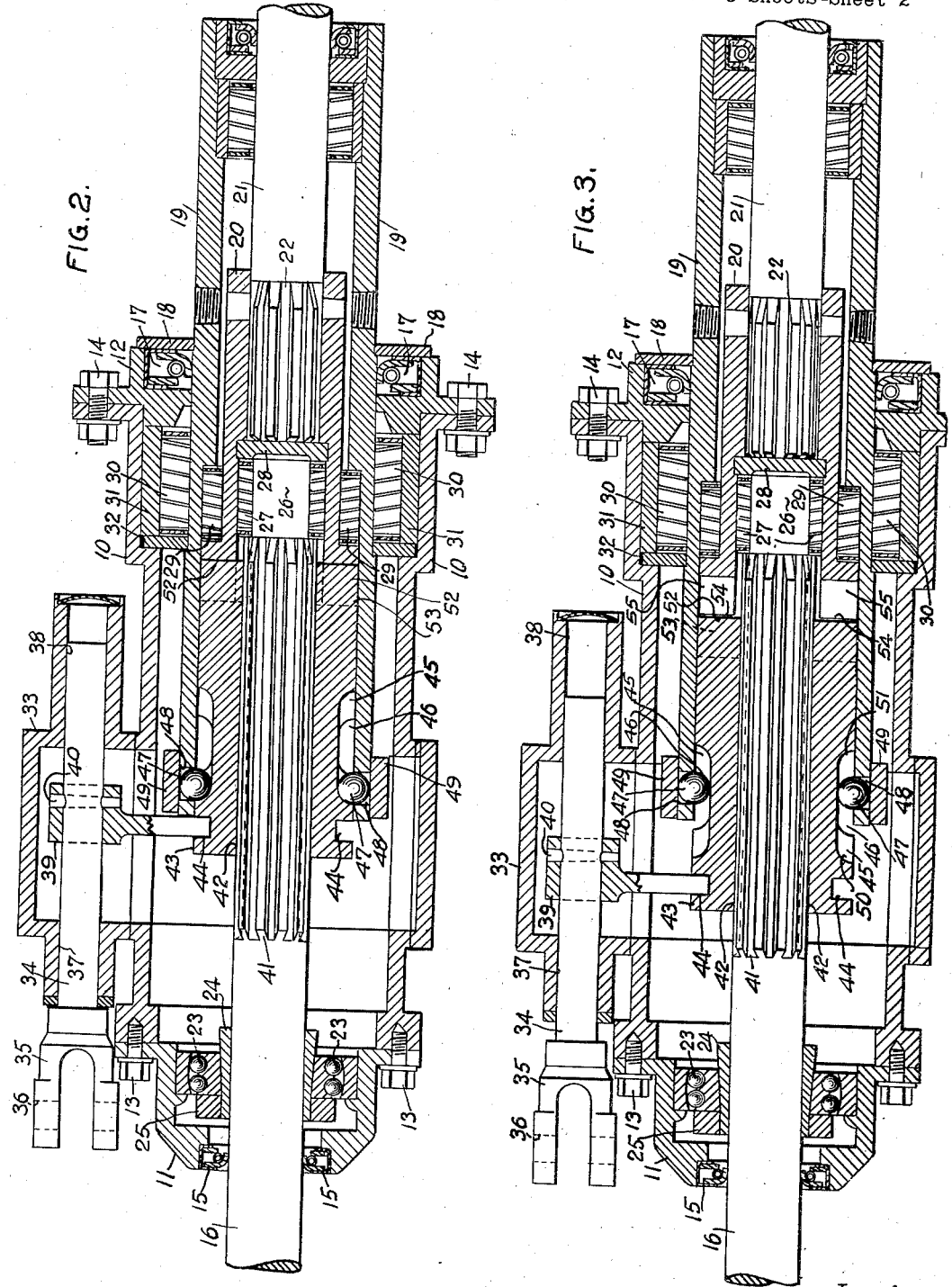
RALPH E. SMITH, *Inventor*
BY Toulmin & Toulmin
*Attorneys*

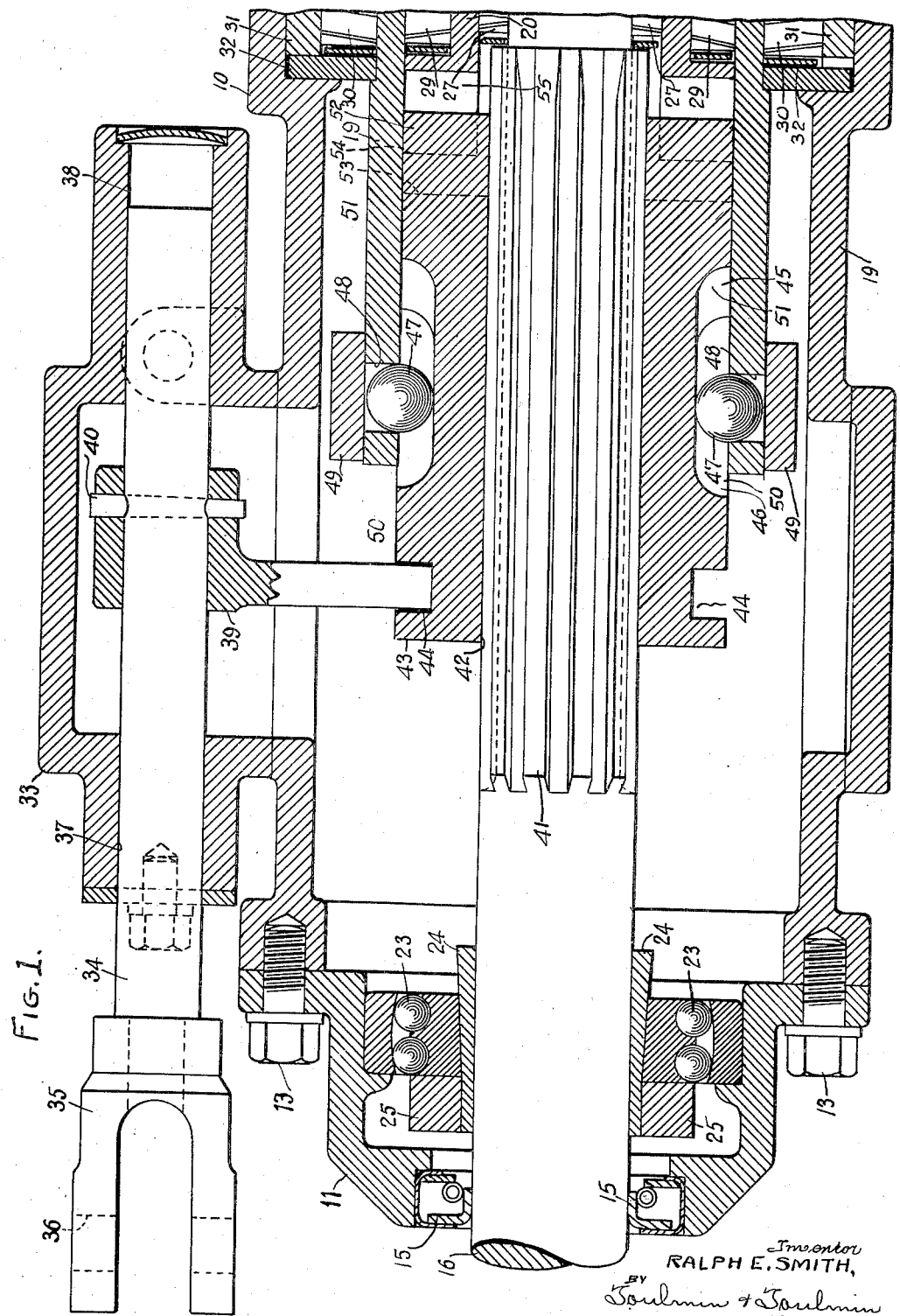

July 18, 1939.　　　　R. E. SMITH　　　　2,166,270
SPLIT DRIVE DUAL CONTROL
Filed Sept. 24, 1937　　　3 Sheets-Sheet 3
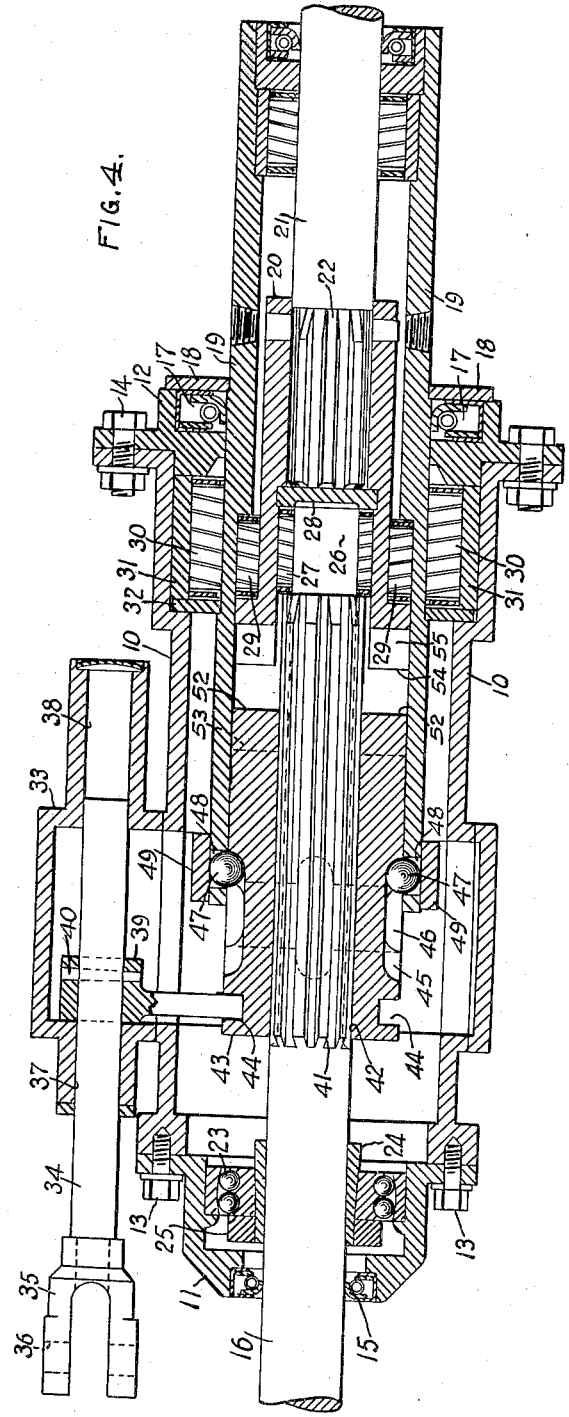
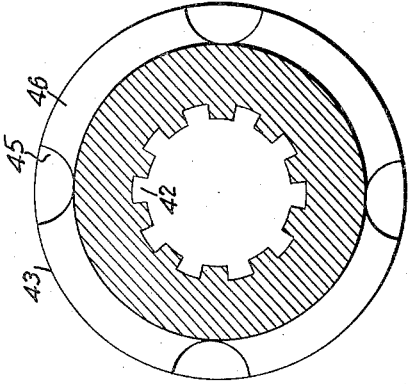
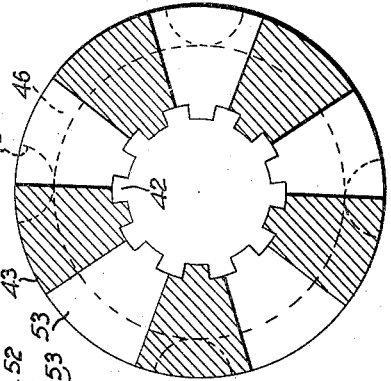
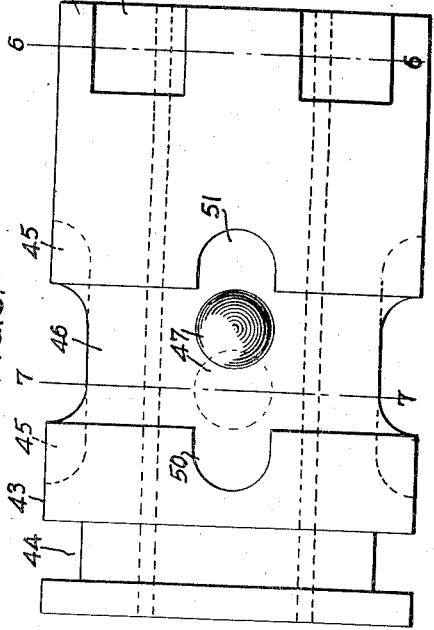
RALPH E. SMITH, Inventor
Toulmin & Toulmin
Attorneys Patented July 18, 1939

2,166,270

UNITED STATES PATENT OFFICE 2,166,270

SPLIT DRIVE DUAL CONTROL

Ralph E. Smith, Galion, Ohio, assignor to The Galion Metallic Vault Company, Galion, Ohio, a corporation of Ohio Application September 24, 1937, Serial No. 165,559

4 Claims. (Cl. 74—11)

This invention relates to power take-offs, and in particular, to such mechanisms for operating auxiliary apparatus from a main power shaft, as in a motor truck.

One object of this invention is to provide a power take-off or split drive dual control, wherein a power-driven shaft is selectively connectible to either or both of a pair of driven shafts.

Another object is to provide such a power take-off mechanism, wherein a sliding clutch member is provided with projecting portions adapted to engage fully or partially with corresponding projecting portions, and thereby to be connected or disconnected with another shaft.

Another object is to provide a power take-off mechanism, wherein a sliding clutch member is provided with projecting portions on one end thereof, and also with balls sliding in longitudinal grooves interconnected by an annular groove in such a manner that in one position the sliding clutch member connects the motor shaft, upon which it slides, with two driven shafts; and in another position connects the motor shaft to drive the first driven shaft only; and in a third position to disconnect the motor shaft from both driven shafts so that the clutch member rotates freely in a neutral position; and in a fourth position to connect the clutch member with the second driven shaft only.

In the drawings:

Figure 1 is an enlarged longitudinal section through the principal portions of a power take-off mechanism embodying the split drive dual control according to the present invention, the parts being shown in a position wherein the clutch member drives one only of a pair of driven shafts.

Figure 2 is a view of the complete power take-off mechanism shown in Figure 1, but with the parts shown in a position wherein the clutch member is driving two driven shafts.

Figure 3 is a view similar to Figure 2, but showing the clutch member in a neutral position, wherein both driven shafts are disconnected from the drive shaft.

Figure 4 is a view similar to Figures 2 and 3, showing the clutch member in a position for driving the second driven shaft only, the first driven shaft being disconnected from the drive shaft.

Figure 5 is a top plan view of the sliding clutch member used in the power take-off mechanism of Figures 1 to 4, with one ball in the position of Figure 3.

Figure 6 is a cross section along the line 6—6 of Figure 5.

Figure 7 is a cross section along the line 7—7 in Figure 5.

Referring to the drawings in detail, Figures 1 to 4 show the power take-off or split drive dual control mechanism as consisting of a casing 10 having end plates 11 and 12 secured thereto, as by the cap screws 13 and bolts 14, respectively. Mounted in the end plate 11 is an oil seal device 15 for preventing the leakage of oil through the end plate along the motor drive shaft 16. The opposite end plate 12 is similarly provided with an oil seal device 17, held in place by a retaining plate 18, through an aperture of which passes the tubular driven shaft 19, hereinafter referred to as the auxiliary driven shaft.

Mounted within the auxiliary driven shaft 19 is a sleeve 20. Within this sleeve 20 is a driven shaft 21, hereinafter referred to as the truck shaft, and operatively connected therewith by means of the splined portions 22. The motor drive shaft 16 is rotatably supported at one end in the anti-friction bearings 23, the inner race of which is mounted upon the tapered sleeve 24 having the retaining ring 25 thereon, whereas the outer race is mounted in the end plate 11. The opposite end of the motor drive shaft 16 is provided with a reduced portion 26, mounted in roller bearings 27 engaging the sleeve 20 on their opposite sides. The retaining plate 28 is mounted between the reduced portion 26 of the shaft 16 and the end of the truck shaft 21.

The sleeve 20 is rotatably mounted in roller bearings 29, the outer portions of which engage the auxiliary shaft 19. The auxiliary shaft 19 is rotatably mounted in roller bearings 30, the outer portions of which engage a ring-shaped member 31 mounted in the casing 10 immediately adjacent the end plate 12. A retaining ring 32 is arranged adjacent the roller bearings 30, at the opposite end thereof from the end plate 12.

The upper portion of the casing is provided with an extension 33 having a clutch-shifting shaft 34 extending therethrough and carrying a clevis 35 on one end having a bore 36 for the reception of a pin, by which it is connected to any suitable lever or other shifting apparatus. The shaft 34 passes through a bore 37 in the extension 33, and its opposite end is slidably supported within the bore 38 thereof. At an intermediate point on the shaft 34 is secured a clutch-shifting yoke 39, as by the taper pin 40. The motor drive shaft 16 is provided intermediately with splined portions 41, adapted to engage corresponding grooves 42 in a sliding clutch member 43 mounted ed thereon. By means of this arrangement the sliding clutch member 43 is drivingly connected to the motor drive shaft 16, yet is slidable longitudinally therealong. For this purpose the sliding clutch member 43 is provided with an annular groove 44, adapted to be engaged by the clutch-shifting yoke 39 in such a manner that the longitudinal motion of the clutch-shifting shaft 34 will move the clutch member 43 longitudinally along the shaft 16.

The clutch member 43 is provided with longitudinal slots 45 arranged at intervals around its periphery, and having an annular groove 46 interconnecting the slots 45. Arranged to rotate in the annular groove 46 and also to slide in the slots 45 are balls 47, the outer portions of which engage apertures 48 in the end of the tubular auxiliary driven shaft 19. A ring 49 surrounds the apertures 48 and retains the balls 47 in position. The annular groove 46 has a width approximately twice the diameter of the balls 47, and the longitudinal slots 45 have lengths approximately four times the diameter of these balls. The combination of the longitudinal slots 45 and the annular groove 46 results in the provision of a series of pockets in the slots 45 on opposite sides of the groove 46. For convenience, the pockets on the left-hand side of the annular groove 46 are designated by the reference numeral 50, and those on the right-hand side by the reference numeral 51.

At the end adjacent the end of the sleeve 20 the sliding clutch member 43 is provided with projections 52, in the form of radial teeth. These projections 52 are separated by recesses 53, the whole being adapted to interlock with projections 54 and recesses 55 in the end of the sleeve 20, which is splined to the truck drive shaft 21.

In the operation of the power take-off or split dual control of this invention the motor drive shaft 16 is connected to the prime mover in the motor truck, the shaft 16 being operatively connected to the engine of the truck, whereas the driven shaft 21 is preferably the propeller shaft of the truck. The tubular shaft 19 is provided with a gear or sprocket by which the power transmitted thereto may be taken off for the operation of auxiliary devices, such as compressors, pumps or other mechanism employed in connection with the apparatus.

With the clutch member 43 shifted to the extreme right-hand position, shown in Figure 2, the teeth 52 thereof fully engage the recesses 55 in the opposite end of the sleeve 20 connected to the truck drive shaft 21. At the same time the balls 47 rest in the pockets 50 at the extreme left-hand ends of the longitudinal slots 45. Under these conditions the rotation of the motor drive shaft 16 will transmit power simultaneously to the sleeve 20 and truck drive shaft 21, and likewise to the tubular driven shaft 19 by way of the balls 47 in the recesses 48.

If now the clutch shaft 34 is moved into the position shown in Figure 1, the teeth 52 of the clutch member 43 will be partially withdrawn from the recesses 55 of the sleeve 20, but will still half engage therewith, thereby continuing to form a driving connection. Meanwhile, however, the balls 47 have moved out of the pockets 50 into the annular groove 46. When the motor shaft 16 is rotated therealong the balls 47 rotate idly in the annular groove 46, transmitting no power between the clutch member 43 and the tubular auxiliary shaft 19. The interengagement of the teeth 52 and recesses 55, however, causes power to be transmitted from the motor shaft 16 to the truck shaft 21 by way of the sleeve 20.

If the clutch member 43 is now shifted into the position shown in Figure 3, the teeth 52 become completely disengaged from the recesses 55 in the sleeve 20, thereby freeing the latter from a power connection with the former. The balls 47, however, move into the right-hand side of the annular groove 46. When the motor shaft 16 is rotated, therefore, the balls 47 continue to rotate idly in the groove 46, and the teeth 52 do not engage the recesses 55. Under these conditions the take-off is in a neutral position with neither the shaft 20 nor the shaft 19 in a driven position.

If, finally, the clutch member 43 be moved to the extreme left-hand position shown in Figure 4, the clutch teeth 52 remain disconnected from the recesses 55 in the sleeve 20, but the balls 47 move into the pockets 51 formed by the right-hand ends of the slots 45. In this position the sleeve 20 and truck shaft 21 remain disconnected from the motor shaft 16, but the tubular auxiliary shaft 19 is driven therefrom by means of the engagement of the balls 47 in the pockets 51.

Accordingly, by this invention I have provided a power take-off mechanism wherein a drive shaft is adapted to drive two driven shafts, either singly or simultaneously. This is done by means of a single sliding clutch member with the simple mechanical parts associated therewith, including the balls 47 and the teeth 52 adapted to engage the recesses 55, either fully or partially.

It will be understood that I desire to comprehend within this invention such modifications as come within the scope of the claims and the invention.

Having thus fully described my invention, what I claim as new and desire to secure by Letters Patent, is:

1. A power take-off mechanism comprising a driving member, a shiftable clutch member drivingly connected thereto, said clutch member having clutching elements and an annular ball race with a plurality of communicating ball pockets, a first power-transmitting member having clutching elements selectively interengageable with the clutching elements of said clutch member, and a second power-transmitting member having balls operatively connected thereto and engageable with said ball race and ball pockets, said clutch member being selectively disposable in a first position with said balls freely rotatable in said ball race but with said clutch elements completely disengaged, and in a second position with said balls drivingly engaged with said ball pockets but with said clutching elements completely interengaged, and in a third position with said balls freely rotatable in said ball race but with said clutching elements only partially interengaged.

2. A power take-off mechanism comprising a driving member, a shiftable clutch member drivingly connected thereto, said clutch member having clutching elements and an annular ball race with a plurality of communicating ball pockets disposed in two spaced sets at opposite edges of said ball race, a first power-transmitting member having clutching elements selectively interengageable with the clutching elements of said clutch member, a second power-transmitting member having balls operatively connected thereto and engageable with said ball race and ball pockets, said clutch member being selectively disposable in a first position with said balls freely rotatable in said ball race but with said clutching elements completely disengaged, and in a second position with said balls drivingly engaged with the first set of said ball pockets but with said clutching elements completely interengaged, and in a third position with said balls freely rotatable in said ball race but with said clutching elements only partially interengaged, and in a fourth position with said balls drivingly engaged with the second set of said ball pockets but with said clutching elements completely disengaged.

3. A power take-off mechanism comprising a driving member, a shiftable clutch member drivingly connected thereto, said clutch member having clutching elements and an annular ball race with a plurality of communicating ball pockets, a first power-transmitting member having clutching elements selectively interengageable with the clutching elements of said clutch member, and a second power-transmitting member having balls operatively connected thereto and engageable with said ball race and ball pockets, said clutch member being selectively disposable in a first position with said balls freely rotatable in said ball race but with said clutch elements completely disengaged, and in a second position with said balls drivingly engaged with said ball pockets but with said clutching elements completely interengaged, and in a third position with said balls freely rotatable in said ball race but with said clutching elements only partially interengaged, said ball race having a width relatively greater than the diameters of said balls whereby said balls may rotate freely in said ball race at two separate locations spaced axially along said clutch member without engaging said ball pockets.

4. A power take-off mechanism comprising a driving member, a shiftable clutch member drivingly connected thereto, said clutch member having clutching elements and an annular ball race with a plurality of communicating ball pockets, a first power-transmitting member having clutching elements selectively interengagable with the clutching elements of said clutch member, and a second power-transmitting member having balls operatively connected thereto and engageable with said ball race and ball pockets, said clutch member being selectively disposable in a first position with said balls freely rotatable in said ball race but with said clutch elements completely disengaged, and in a second position with said balls drivingly engaged with said ball pockets but with said clutching elements completely interengaged, and in a third position with said balls freely rotatable in said ball race but with said clutching elements only partially interengaged, said clutching elements comprising interengageable teeth having axially elongated dimensions whereby to provide a full power-transmitting connection when said teeth are either partially or fully interengaged.

RALPH E. SMITH.